(12) United States Patent
Arquie (10) Patent No.: US 10,648,794 B2
(45) Date of Patent: May 12, 2020

(54) METHOD FOR INSPECTION OF A MACHINE PART

(71) Applicant: Safran Aircraft Engines, Paris (FR)

(72) Inventor: Fabien Jean-Guillaume Arquie, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 101 days.

(21) Appl. No.: 16/073,183

(22) PCT Filed: Jan. 27, 2017

(86) PCT No.: PCT/FR2017/050198
§ 371 (c)(1),
(2) Date: Jul. 26, 2018

(87) PCT Pub. No.: WO2017/129924
PCT Pub. Date: Aug. 3, 2017

(65) Prior Publication Data
US 2019/0041191 A1 Feb. 7, 2019

(30) Foreign Application Priority Data
Jan. 28, 2016 (FR) .................................. 16 50701

(51) Int. Cl.
| | | |
|---|---|---|
| G01B 11/06 | (2006.01) | |
| G01B 11/16 | (2006.01) | |
| G01B 11/24 | (2006.01) | |
| G06T 7/00 | (2017.01) | |
| G01N 21/88 | (2006.01) | |
| G01N 21/95 | (2006.01) | |

(52) U.S. Cl.
CPC .......... G01B 11/0616 (2013.01); G01B 11/16 (2013.01); G01B 11/24 (2013.01); G01N 21/8806 (2013.01); G01N 21/9515 (2013.01); G06T 7/001 (2013.01); G01N 2021/8829 (2013.01); G06T 2207/10028 (2013.01); G06T 2207/30164 (2013.01)

(58) Field of Classification Search
CPC ..... G01B 11/0616; G01B 11/24; G01B 11/16; G01N 21/9515; G01N 21/8806; G01N 2021/8829; G06T 7/001; G06T 2207/30164; G06T 2207/10028
See application file for complete search history.

(56) References Cited

U.S. PATENT DOCUMENTS

| | | | |
|---|---|---|---|
| 2002/0128790 A1* | 9/2002 | Woodmansee | B23P 6/002 702/81 |
| 2004/0054256 A1 | 3/2004 | Ogawa | |
| 2010/0110451 A1 | 5/2010 | Biswas et al. | |

(Continued)

Primary Examiner — Carol Wang
(74) Attorney, Agent, or Firm — Blank Rome LLP (57) ABSTRACT

A method of inspecting the wear of a turbine engine part includes, by means of a calculator:
a reference plane is defined;
by measuring said part to be inspected, a modelling of at least a portion of said part is acquired in the form of a three-dimensional inspection grid;
the three-dimensional inspection grid is inspected with the reference plane, using a dedicated algorithm using a projection of points (10; 10.1, 10.2, . . . , 10.n);
if the result of the comparison is included in a predetermined tolerance range, the part is defined as compliant; otherwise, the part is non-compliant.

8 Claims, 5 Drawing Sheets

(56) References Cited

U.S. PATENT DOCUMENTS

| | | | |
|---|---|---|---|
| 2011/0180727 A1* | 7/2011 | Kell | G01B 11/0658 |
| | | | 250/459.1 |
| 2015/0187067 A1 | 7/2015 | Bendall et al. | |
| 2016/0103050 A1* | 4/2016 | Fabrizius | G01N 3/56 |
| | | | 356/630 |
| 2017/0132777 A1* | 5/2017 | Durrant | G06T 7/0002 |

* cited by examiner

METHOD FOR INSPECTION OF A MACHINE PART

CROSS-REFERENCE TO RELATED APPLICATIONS

This application is a national stage of International Application NO. PCT/FR2017/050198, filed on Jan. 27, 2017, which claims the benefit of French Patent Application No. 1650701, filed on Jan. 28, 2016, the contents of each of which are incorporated herein by reference.

TECHNICAL FIELD

The present invention relates to a method for dimensional inspection of a machine part, particularly a turbine engine part.

BACKGROUND

Machine parts, particularly rotating parts of turbine engines such as the blades, which may be impacted by foreign bodies, gradually deteriorate as the machine is used. This is the case in particular of the areas reinforced by applying a layer of stellite (a very hard material), which deteriorate owing to the high levels of friction to which they are exposed.

In order to comply with the safety standards, the parts and more specifically the stellite areas, must have a maximum level of wear, without the risk of needing to be replaced. Hence, during the maintenance phases, the parts are examined in order to ascertain whether their level of wear is acceptable or unacceptable. In the event of unacceptable wear, the part must be replaced.

A known method for inspecting the level of wear of the turbine engine parts involves an operator:
- disassembling the parts;
- measuring the thickness of the parts using contact three dimensional measuring machines;
- comparing these measurements with tolerance ranges and
- determining whether these parts can be reinstalled on the turbine engine or whether they need to be replaced.

This method does not allow precise measurement of the thickness of the parts. Indeed, several parameters negatively influence measurement of the parts.

Firstly, the operations, performed by the operator, are repetitive. Thus and this particularly applies to measurement and comparison of the measurements, the operator's visual acuity gradually decreases over a working day and the operator may, at the end of the day, interpret a measurement incorrectly. This may for example be the case for the last part of a series of identical parts.

Secondly, contact tridimensional measurement machines use components such as scale readers or probes that may become out of adjustment or worn over time. In this case, these components require recurrent calibration or replacement. These calibrations need temporary immobilisation of the machine and incur a high operating cost.

Thirdly, the probes commonly used comprise a rod with a ball at the end that contacts the part to be measured. Although quite precise measurements can be obtained, some areas of the part, particularly areas that are difficult to access or very small, may not be reached by the sensor. Thus, the part cannot be measured in the best possible manner.

Finally, mounting the part on a bench of the measurement machine and the wear of said bench affect the quality and result of the measurement. Thus, repeatability of the measurement is not optimal.

SUMMARY

The invention more particularly aims at providing a simple, efficient and cost-effective solution to this problem.

For this purpose, the invention firstly provides for a contactless dimensional method of inspecting the wear of a turbine engine part, wherein the method comprises stages in which, by means of a calculator:
- a reference plane having a first reference frame is defined;
- by measuring said part to be inspected, a modelling of at least a portion of said part is acquired in the form of a three-dimensional inspection grid having a second reference frame, wherein the first and second reference frames are each oriented in a predetermined manner in relation to a third reference frame specific to the turbine engine;
- the part is inspected, in an area common to the three-dimensional grid and the reference plane, through a dedicated algorithm using a projection of points wherein:
  - for said common area, the reference plane comprises a field of theoretical points which are projected in a projection perpendicular to said reference plane, from said reference plane towards the three-dimensional inspection grid;
  - for each projected point, a projection distance is calculated between the reference plane from which said point is projected and the intersection of said point with the three-dimensional inspection grid;
  - the projection distances of the points are compared, so as to identify a maximum distance among said projection distances and a corresponding projected maximum wear point,
  - a minimum wear thickness of the part is determined, measured between the projection on the three-dimensional grid of said projected maximum wear point and a fourth reference frame specific to the part and oriented in relation to the second reference frame,
  - said minimum thickness is compared with a predetermined wear tolerance range and
- if the result of the comparison is within said predetermined wear tolerance range, the part is defined as compliant; if the result of the comparison is outside said predetermined wear tolerance range, the part is defined as non-compliant.

Preferably, the minimum thickness is measured perpendicularly to the fourth reference frame.

Advantageously, the points of the field of points are distributed evenly over the reference plane.

A method of this kind makes it possible, on the one hand, to use digital technological means to overcome the decline in operators' visual acuity and carry out precise inspection regardless of the moment at which these measurements are taken.

Moreover, this method improves repeatability of the inspection operations since all the parts to be inspected are oriented in the reference frame of the turbine engine. Hence, any positioning error of the part to be inspected is avoided, since the position of all the parts to be inspected is predetermined.

Finally, precision of the inspection is enhanced in relation to the known method since even the areas that are difficult to access can be modelled and therefore be inspected.

According to one aspect, during the comparison stage, an initial selection of the points is performed in which projected points not encountering the three-dimensional grid are excluded.

Advantageously, during the comparison stage and with reference to the points not excluded, an area specific to said part and defined among all the points crossing the three-dimensional inspection grid is determined.

Likewise, during the comparison stage, a second selection of points can be made in which the points that do not form part of the specific area are excluded.

During the second selection of points, it is possible, for each projected point to:
- measure an angle between projection of said projected point and a normal at a tangent to the three-dimensional inspection grid, at the crossing of the projection of said point with the three-dimensional inspection grid and
- compare said angle with a predetermined angular tolerance range, and, if the angle is included within said angular tolerance range, the point is taken into account in defining compliance of the part; if the angle is not included within said angular tolerance range, the point is in this case not taken into account by the dedicated algorithm for defining compliance of the part.

The angular tolerance range may be between 0° and 15°.

The purpose of these selections is to delimit the specific area to be studied, the topology of which may vary significantly depending on its deterioration during its use in the turbine engine.

Advantageously, the part may comprise a coating that covers it, the minimum wear thickness of which is to be determined.

Secondly, an installation for contactless dimensional inspection of a turbine engine part is proposed for application of the inspection method as described above, wherein the installation comprises:
- a three-dimensional acquisition unit capable of generating a three-dimensional inspection grid for the part to be inspected;
- a calculator capable of applying said dedicated algorithm and
- a communication interface between an operator and the installation.

BRIEF DESCRIPTION OF THE DRAWINGS

The invention will be better understood and other details, characteristics, and advantages of the invention will appear on reading the following description given by way of non-limiting example and with reference to the accompanying drawings, in which.

DETAILED DESCRIPTION

Figure 1:
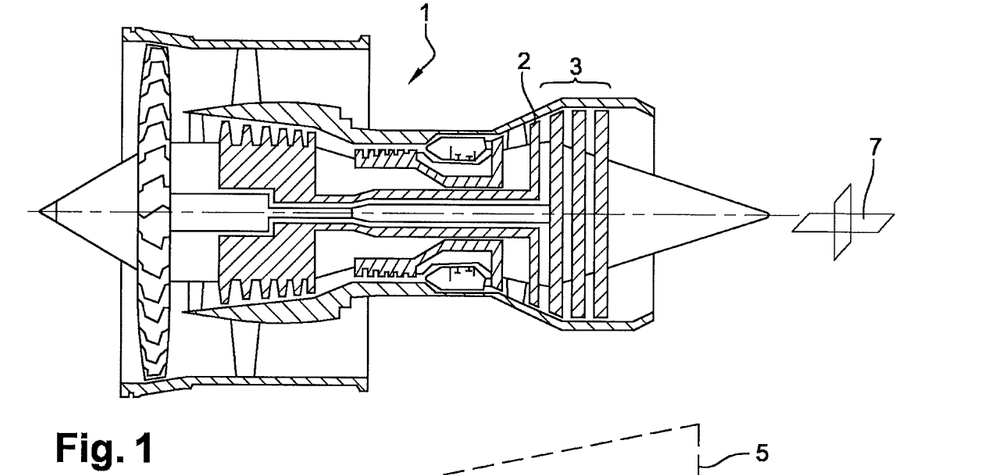
FIG. 1 is a sectional diagrammatic view of a turbine engine.

Even though parts other than the blade 4 below could be inspected using the method presented here, the case of inspection of a blade will be referred to below. Hence, FIG. 1 illustrates a turbine engine 1 comprising a high-pressure turbine 2 and a low-pressure turbine 3. The turbines 2, 3 each comprise several parts, particularly blades 4, which may be circumferentially abutted and partly form a turbine stage.

As use of the turbine engine 1 progresses, the blades become worn and their wear needs to be inspected so that the defective blades are replaced in order to preserve the turbine engine 1.

Figure 2:
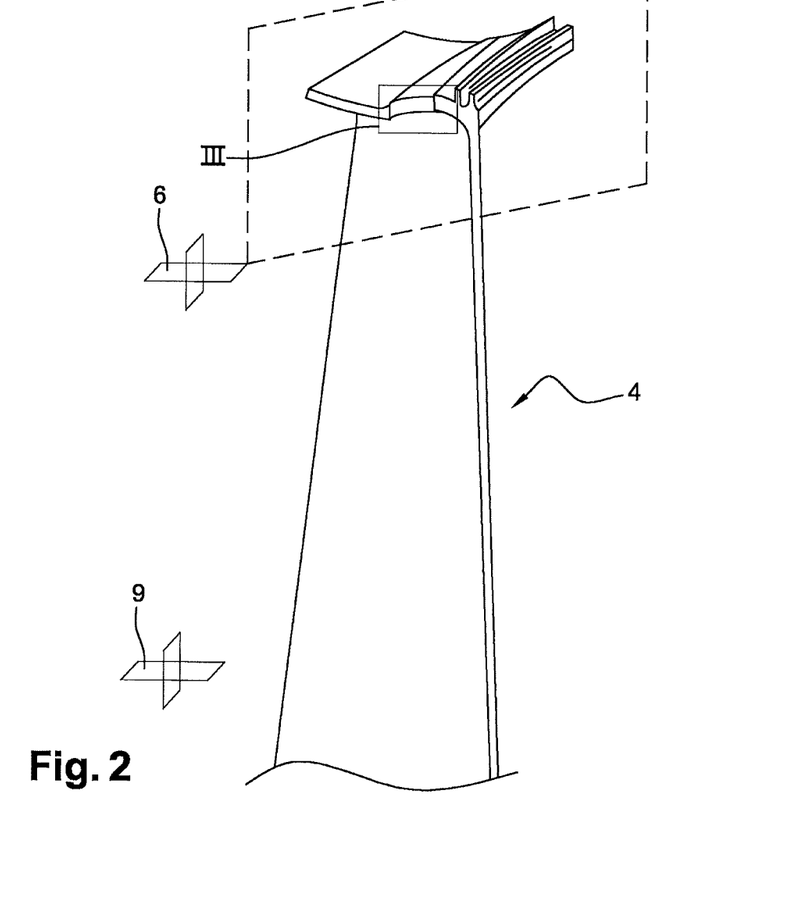
FIG. 2 is a perspective view of a turbine blade of the turbine engine in FIG. 1.
Figure 3:
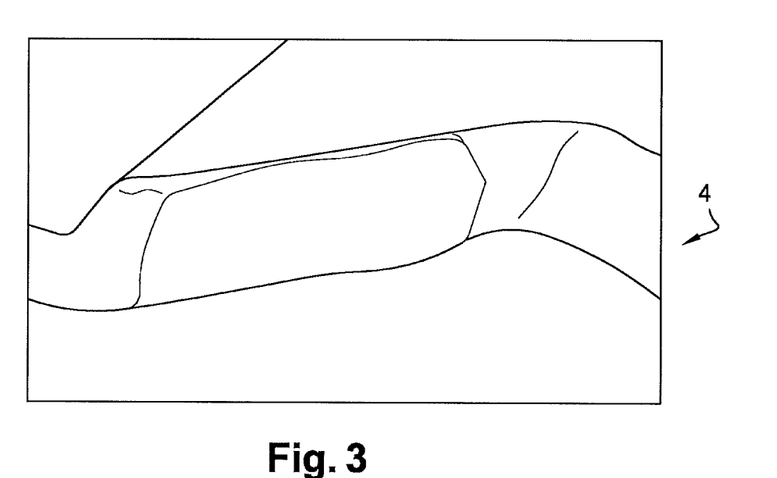
FIG. 3 is a detailed view of a turbine engine blade to be inspected according to inset III in FIG. 2.

FIG. 2 shows a perspective detailed view of a blade 4, the dimensions of which are to be inspected in order to determine whether the part is fit to be installed on a turbine engine or on the contrary, whether it needs to be replaced with a compliant part. More specifically, the aim is to inspect the thickness of mechanical reinforcement layer or coating that covers, at least partially, the blade 4 and protects the latter, such as a layer of stellite. Stellite is a very resistant material that protects the blades 4 against friction and especially heating.

The compliance of a blade 4 can therefore be understood as the ability of said blade 4 to have a reinforcement layer thick enough to resist friction, particularly the increase in temperature.

Figure 6:
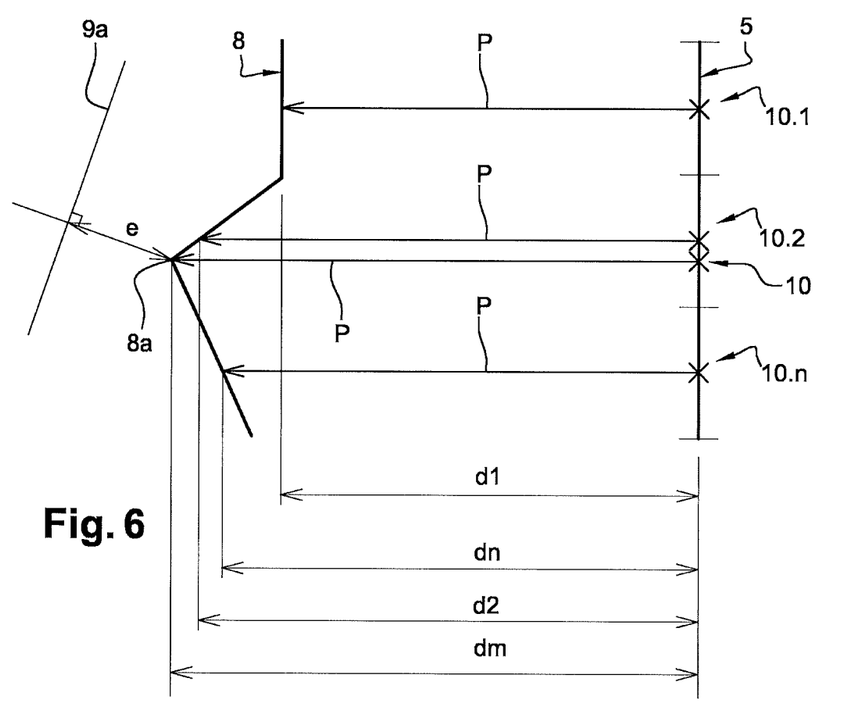
FIG. 6 is a diagram representing a stage of projection of points of the inspection method.

The inspection method comprises a first stage in which a reference plane 5 is available, illustrated in FIGS. 2 and 6. This reference plane 5 comprises a first reference frame 6. The first reference frame 6 is oriented in a predetermined manner, i.e. in such a way as to be positioned according to a reference frame specific to the turbine engine, known as the third reference frame 7 (FIG. 1), in which the blade to be inspected is mounted.

Figure 4:
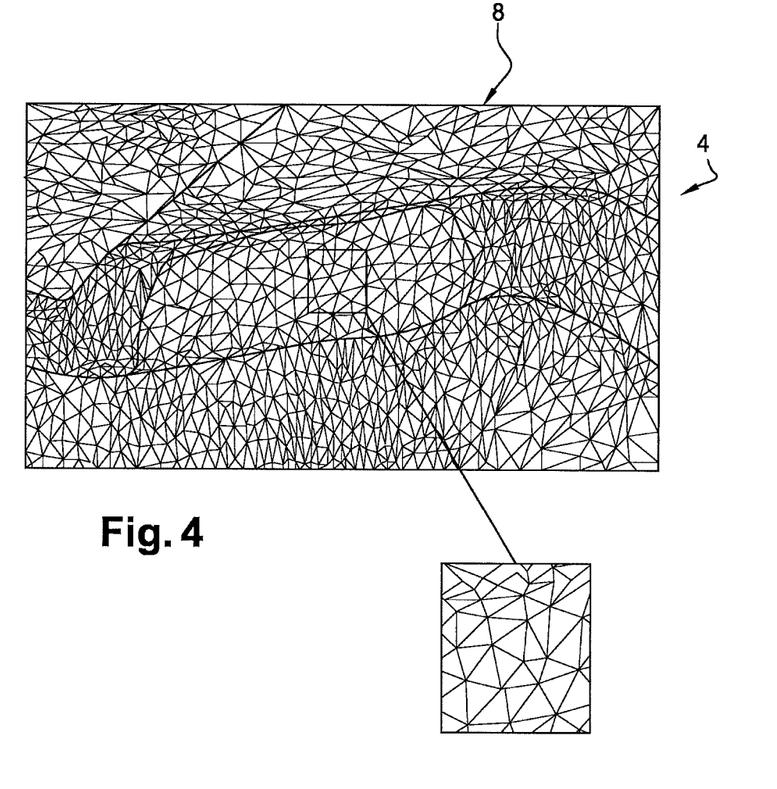
FIG. 4 is a detailed view of a grid of a scan of the part in FIG. 3, wherein said figure comprises an enlarged scale round detailed inset showing the grid.

In a second stage of the inspection method, shown in FIG. 4, the blade 4 to be inspected (i.e., the coated blade) is digitised using a three-dimensional scanner, for example in the form of a cloud of dots, in order to obtain a three-dimensional inspection grid 8, hereinafter known as an inspection grid 3. The inspection grid 3 comprises a second reference frame 9 (FIG. 2).

It is reminded that a grid is a surface reconstruction of an external contour of an object by means of triangles of different sizes, i.e. surfaces formed of three points, wherein each triangle is linked to several other triangles so that the surface reconstruction obtained is free of holes, i.e. devoid of absence of surface.

Preferably, only a part of the blade 4 to be inspected is digitised. The entire blade 4 may however be modelled depending on the scope of inspection of the blade 4.

The inspection grid 8 also is subsequently positioned in relation to the turbine engine. More specifically, the second reference frame 9 is oriented in a predetermined manner in relation to the third reference frame 7. The expression "in a predetermined manner" implies that the inspection grid 8 is oriented in the same way as the part 4 is actually oriented in the turbine engine 1.

Hence, the reference plane 5 and the inspection grid 8 have a common reference frame, in this case the third reference frame 7. This common reference frame makes it possible in particular to perform a third stage of the inspection method involving determining the wear of the blade 4 in an area common to the reference plan 5 and the inspection grid 8 in order to ascertain whether the blade 4 may or may not be used, particularly on the turbine engine 1.

During this third stage, a dedicated algorithm checks the wear of the blade 4 to be inspected, by projection of points from the reference plane 2, as described below and illustrated in FIGS. 5 and 6.

Firstly, a field of points 10 (referenced 10.1, 10.2, . . . , 10.n in FIG. 6) is projected according to a projection P perpendicular to said reference plane 5, from the latter, towards the inspection grid 8 until said points 10; 10.1, 10.2, . . . , 10.n encounter the inspection grid 8. Advantageously, the points 10.1, 10.2, . . . , 10.n are distributed evenly over the reference plane 5, for example according to a constant step.

Next, for each projected point 10; 10.1, 10.2, . . . , 10.n, a distance d1, d2, dn, . . . is calculated between the reference plane 5 from which said point 10; 10.1, 10.2, . . . , 10.n is projected and the intersection of said point 10; 10.1, 10.2, . . . , 10.n with the inspection grid 8.

The dedicated algorithm subsequently compares the projection distances d1, d2, dn, . . . between each other, so as to identify among them a maximum distance dm.

FIG. 6 shows diagrammatically the projection of points 10; 10.1, 10.2, . . . , 10.n from the reference plane 5 to the inspection grid 8 and determination of the maximum distance dm.

Subsequently, from the projected point 10 defining the maximum distance dm, the dedicated algorithm determines a minimum thickness e of the blade 4, between the crossing of said projected point 10 with the three-dimensional grid 8 and a fourth reference frame 9a specific to the part 4 and oriented in relation to the second reference frame 9 of the three-dimensional grid 8. The minimum thickness e and the fourth reference frame are illustrated in FIGS. 6 and 7.

Figure 7:
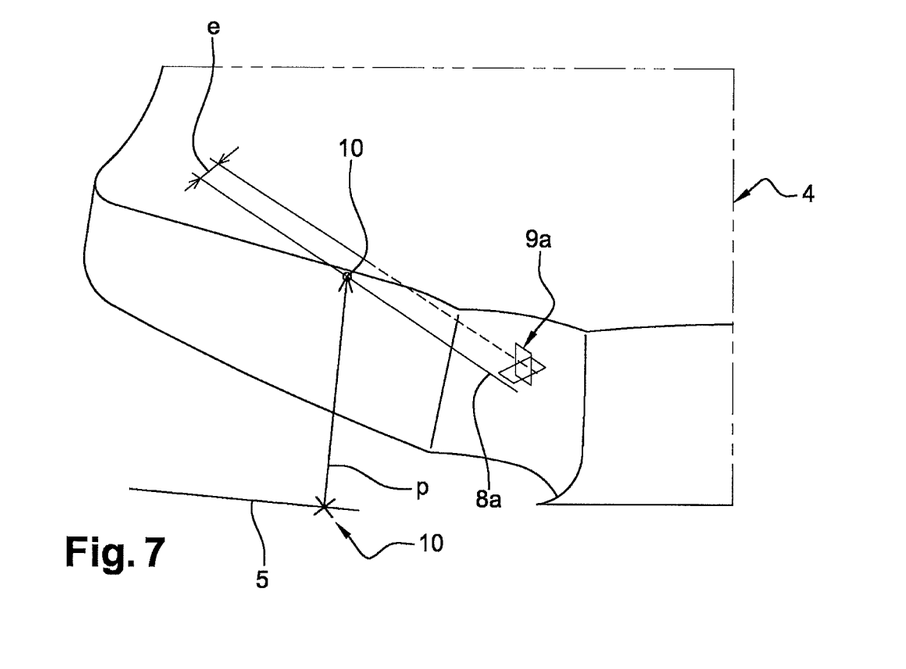
FIG. 7 is a view partly showing determination of the minimum thickness of the part to be inspected.

In FIGS. 6 and 7, the reference 8a denotes diagrammatically the projection of the maximum wear point 10 on to the three-dimensional grid 8 corresponding to the maximum distance dm.

Preferably, the minimum thickness is measured perpendicularly to the fourth reference frame. The dedicated algorithm subsequently compares the minimum thickness with a predetermined wear tolerance range.

If the result of the comparison is within said predetermined wear tolerance range, the blade 4 is defined as compliant; on the other hand, if the result of the comparison is not within said predetermined wear tolerance range, the blade 4 is non-compliant.

A blade 4 displaying excessive wear is rejected in order to guarantee good safety in use of the machine. Indeed, excessive wear of the blade 4 may cause its malfunction or even its breakage.

In order to delimit a specific area 11 for inspection of a blade 4, several levels of selection of projected points 10 can be carried out during the comparison stage.

Figure 5:
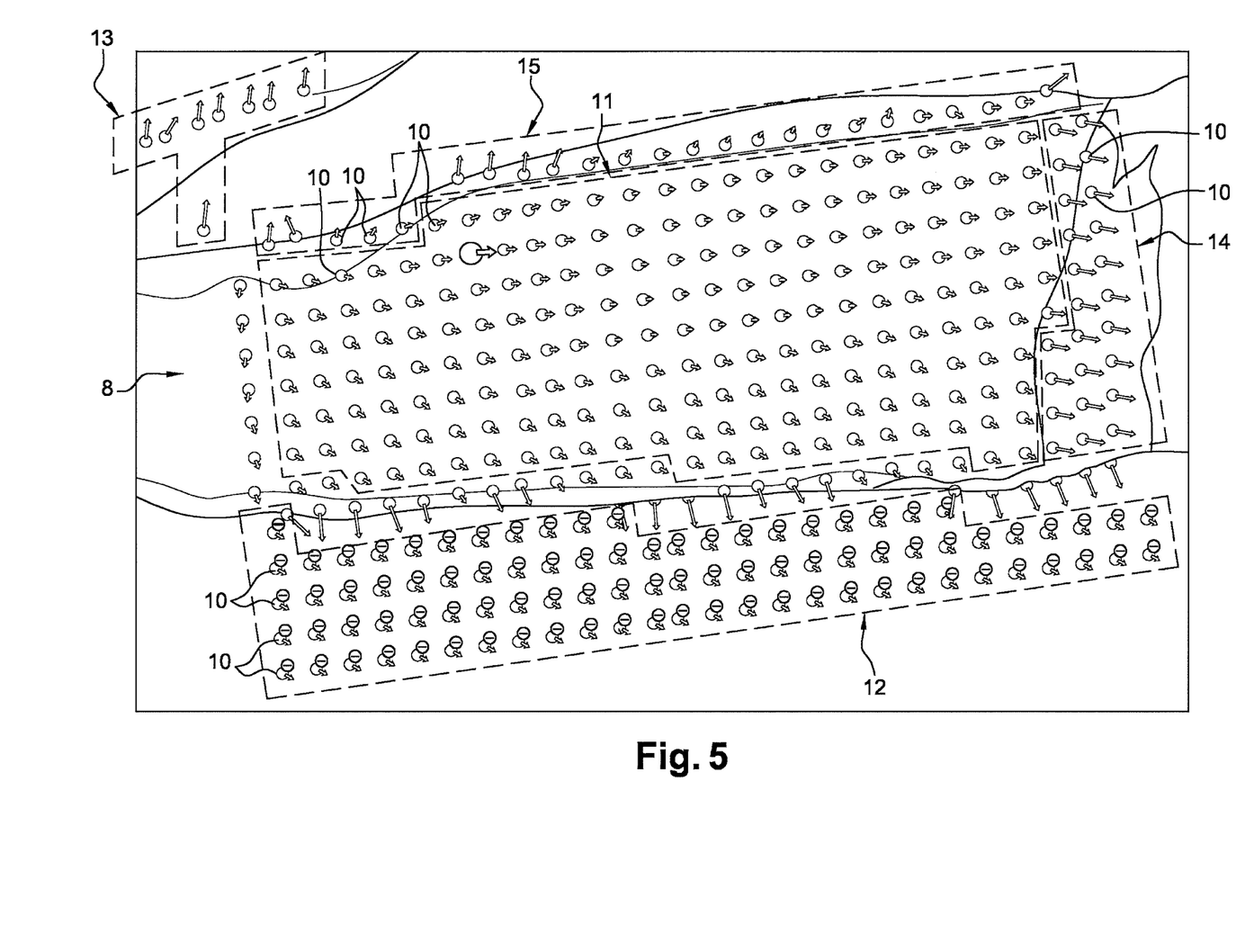
FIG. 5 is a detailed view showing a stage of the inspection method involving a projection of points on to the digitised model to determine whether the part to be inspected is compliant or non-compliant.

At a first level, an initial selection of points 10 is made, in which the projected points 10 not encountering the control grid 8 are excluded, represented by an area 12 surrounded by short dotted lines in FIG. 5. This exclusion is justified by the fact that it is unnecessary and above all impossible to calculate a distance between the origin of the projection point 10, i.e. the reference plane 5, and the intersection of the projection P with the inspection grid 8.

This selection can be carried out using the dedicated algorithm when the latter detects that for a given point 10, the projection of the latter has not encountered the inspection grid 8 or calculation of the distance between the origin and intersection takes too long to perform or a value cannot be determined.

At a second level, based on the points 10 not excluded following the initial selection, the dedicated algorithm determines the area 11 specific to said blade 4, defined among the set of points 10 crossing the inspection grid 8. This selection serves to exclude from the method the points 10 that are not included in the specific area 11 previously determined. The specific area 11 is represented in FIG. 5 by an area surrounded by long dotted lines.

Figure 8:
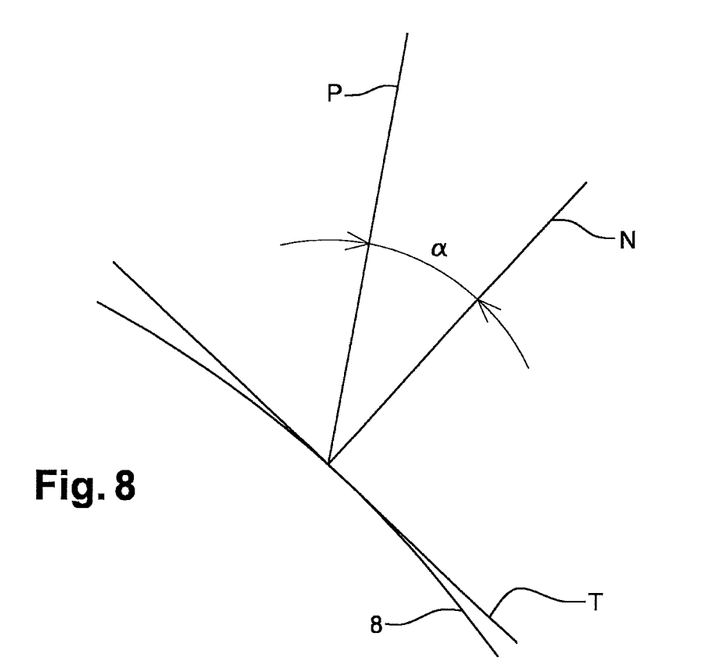
FIG. 8 is a diagram partly showing determination of an area of the grid in FIG. 2 in which wear inspection is to be performed and FIG. 9 is a diagrammatic view showing an installation for dimensional inspection of a turbine engine part.

FIG. 8 partly illustrates determination of the specific area 11 during a second selection of points, i.e. at the second level.

During the second selection of points, for each projected point 10; 10.1, 10.2, . . . , 10.n:

an angle $\alpha$ is measured between the projection direction P of said projected point 10; 10.1, 10.2, . . . , 10.n and a normal N at a tangent T to the three-dimensional inspection grid 8, at the crossing of said point with the three-dimensional inspection grid 8 and said angle $\alpha$ is compared with a predetermined angular tolerance range, if $\alpha$ is within said angular tolerance range, the point 10; 10.1, 10.2, . . . , 10.n is taken into account in determining the wear of the blade 4; on the other hand, if a is outside said angular tolerance range, the point 10; 10.1, 10.2, . . . , 10.n is not taken into account in determining the wear of the blade 4.

Preferably, the tolerance range of the angle $\alpha$ is between 0° and 15°, with the value of the angle $\alpha$ being an absolute value.

Finally, at a third level, a further selection is performed excluding the points 10 situated in a so-called backflow portion, i.e. a portion not originally existing on the blade 4 to be inspected in which the material flows as the turbine engine 1 is used.

Thus, only the specific area 11 will be analysed by the method, typically an area of the blade 4 in which mechanical stresses are concentrated when the machine is in use. The purpose of these selections is to delimit the specific area to be studied, the topology of which may vary significantly depending on its deterioration during its use in the machine.

Around the specific area 11, several areas of points 10 not taken into account are identified. A first area 13 comprises points 10 that are outside the area for which it is sought to inspect the wear. However, unlike area 12 described above, the points of the area 10 cross the inspection grid 8. A second area 14 comprises the points outside the second level selection. The points 10 of the area 13 could also be considered as belonging to the second area 14, i.e. they could be excluded during the second selection. Finally, a third area 15 is deliberately excluded, with this area 15 comprising the points 10 situated in the so-called backflow portion, i.e. a portion not originally existing on the blade 4 to be inspected in which the material flows as the turbine engine 1 is used. This area 15 corresponds to exclusion of the points 10 during the third level selection.

It is pointed out however that in FIG. 5, the angle of view used makes it difficult to distinguish between certain points 10 of the second area 14 and those of the specific area 11. It should nevertheless be noted that if the orientation of the arrows of the points 10 are shorter in the specific area 11 than the arrows of the points 10 of the second area 14, which shows that the angle α of the normal N with the respective projections of the points 10 of the area 14 is greater than the predetermined angular tolerance.

Figure 9:
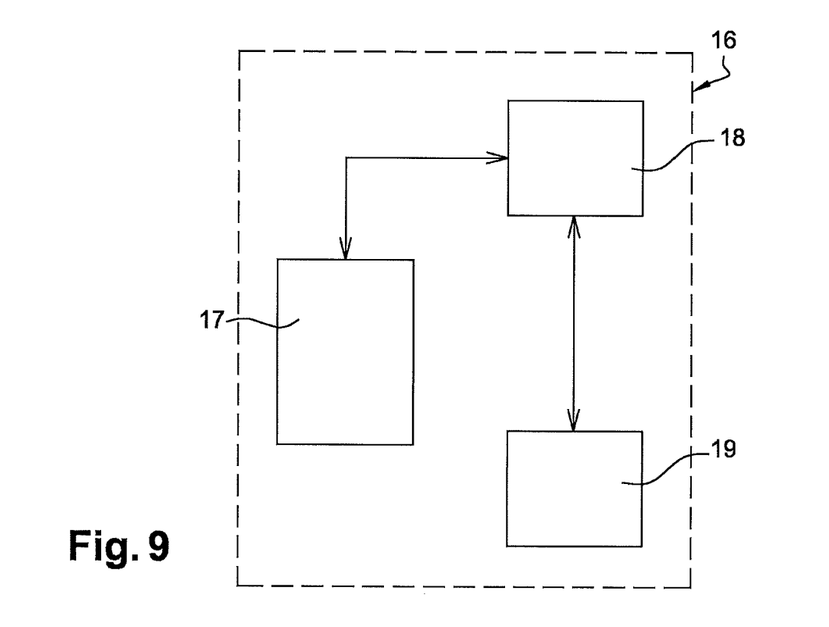

For application of a method such as the one just described, an inspection installation 16 is used, illustrated in FIG. 9, comprising:
- a three-dimensional model acquisition unit 17, typically a three-dimensional scanner;
- a calculator 18 and
- a communication interface 19, typically a computer.

The acquisition unit 17 makes it possible to obtain a cloud of dots representing the blade 4 to be inspected. More specifically, this acquisition unit 17 makes it possible to obtain a faithful three-dimensional digital grid of the blade 4 to be inspected in which all the surfaces, however small, are reproduced.

Advantageously, the acquisition unit 17 comprises an assembly table having components for locking and holding in position the blades 4 to be inspected, with these components being movable in order to adapt to blades 4 of different shapes and sizes. Preferably, positioning plans for these components for locking and holding in position are to be made so that for all blades of a same range, the reference frame and position are the same in the scanner.

The calculator 18 serves to apply the dedicated algorithm which, as seen above, generates the inspection grid 8, determines the maximum wear of the blade 4 and provides information about the dimensional compliance of the area of the blade 4 to be inspected.

Finally, the communication interface 19 allows an operator on the one hand real time monitoring of the progress of inspection of the blade 4 and on the other hand, interaction with the calculator 18 in order to modify or provide new setpoints for execution of the algorithm.

Furthermore, the communication interface 19 informs the operator of the inspection result so that the operator can issue the order that the blade 4 may be reinstalled on the turbine engine 1 or that on the contrary, it needs to be replaced with a new blade 4.

The inspection method and inspection installation 16 that have just been described offer several advantages.

Firstly, the quality of the inspection is better compared to an inspection performed solely by an operator using mechanical measurement machines, the reliability of which declines over time. Indeed, use of contactless digital means makes it possible to overcome deterioration of the mechanical components and provides a precise inspection result even in areas that are difficult to be access using a mechanical measurement machine.

Then, correct repeatability of the inspection can be achieved for several similar parts.

Finally, inspection of a blade 4 is accelerated in relation to a conventional method in that all the measurements and comparisons are performed by a calculator 18.

The invention claimed is:

1. A contactless dimensional method of inspecting a wear of a part of a turbine engine, wherein the method comprises stages in which, by means of a calculator:
    a reference plane-having a first reference frame is defined;
    by measuring said part to be inspected, a modelling of at least a portion of said part is acquired, in the form of a three-dimensional inspection grid having a second reference frame, wherein the first and second reference frames are each oriented in a predetermined manner in relation to a third reference frame specific to the turbine engine, wherein said reference plane is defined as comprising points projected according to a projection perpendicular to said reference plane, from said reference plane, towards the three-dimensional inspection grid;
    the part is inspected, in an area common to the three-dimensional grid and the reference plane, through a dedicated algorithm using a projection of points wherein:
        for said common area, the reference plane comprises a field of theoretical points which are projected according to said projection perpendicular to said reference plane, from said reference plane towards the three-dimensional inspection grid;
        for each projected point encountering the three-dimensional inspection grid, a projection distance is calculated between the reference plane and an intersection of said projected point with the three-dimensional inspection grid;
        the projection distances of said projected points encountering the three-dimensional inspection grid are compared to identify a maximum distance among said projection distances and a corresponding projected maximum wear point, wherein:
        during a comparison phase, before said comparison of the projection distances of the projected points, an initial selection of the projected points is made in which projected points not encountering the three-dimensional inspection grid are excluded,
        a minimum wear thickness of the part is determined, measured between a projection on the three-dimensional inspection grid of said projected maximum wear point and a fourth reference frame, wherein the fourth reference frame is specific to the part and oriented in relation to the second reference frame,
        said minimum wear thickness is compared with a predetermined wear tolerance range and
    if the result of the minimum wear thickness comparison is within the predetermined wear tolerance range, the part is defined as compliant; if the result of the comparison is outside the predetermined wear tolerance range, the part is defined as non-compliant.

2. The method according to claim 1, wherein the minimum wear thickness is measured perpendicularly to the fourth reference frame.

3. The inspection method according to claim 1, wherein the projected points are distributed evenly over the reference plane.

4. The method according to claim 1, wherein during the comparison phase and with reference to projected points not excluded, an area, specific to said part and defined among all the projected points crossing the three-dimensional inspection grid, is determined.

5. The method according to claim 4, wherein during the comparison phase, a second selection of points is made in which points that do not form part of the area specific to said part are excluded.

6. The method according to claim 5, wherein during the second selection of points, for each projected point:
    an angle is measured between the projection of said projected point and a normal at a tangent to the three-dimensional inspection grid, at the crossing of the projection of said projected point with the three-dimensional inspection grid and said angle is compared with a predetermined angular tolerance range, and, if the angle is included within said predetermined angular tolerance range, the projected point is taken into account by the dedicated algorithm in defining compliance of the part; if the angle is not included within said predetermined angular tolerance range, the projected point is not taken into account for defining compliance of the part.

7. The method according to claim 6, wherein the predetermined angular tolerance range is included between 0° and 15°.

8. The method according to claim 1, wherein the part comprises a coating that covers the part, the minimum wear thickness of which is to be determined.

\* \* \* \* \*